(12) United States Patent
Shirakawa

(10) Patent No.: US 6,826,770 B2
(45) Date of Patent: Nov. 30, 2004

(54) DISK DRIVING DEVICE WITH IMPROVED DISK HOLDING FEATURES

(75) Inventor: Tomohiro Shirakawa, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 134 days.

(21) Appl. No.: 10/245,331

(22) Filed: Sep. 18, 2002

(65) Prior Publication Data

US 2003/0058780 A1 Mar. 27, 2003

(30) Foreign Application Priority Data

Sep. 27, 2001 (JP) .................................... P 2001-295421

(51) Int. Cl.[7] ....................... G11B 17/028; G11B 17/03; G11B 19/20
(52) U.S. Cl. .................................................... 720/697
(58) Field of Search ................................ 720/697, 690, 720/658, 695, 696, 689; 369/176, 263, 263.1, 258, 258.1, 75.1, 75.11

(56) References Cited

FOREIGN PATENT DOCUMENTS

| JP | 61-206958 | | 9/1986 |
|----|-----------|---|--------|
| JP | 64-86356 A | * | 3/1989 |
| JP | 11-195284 | | 7/1999 |

* cited by examiner

Primary Examiner—Julie Anne Watko
(74) Attorney, Agent, or Firm—Morgan, Lewis & Bockius, LLP

(57) ABSTRACT

The receiving surface of a bearing 20 is divided into four segments including a first divided receiving surface which is the end surface of a gate 25, a second divided receiving surface, a third divided receiving surface and a fourth divided receiving surface. An extraction stopping protrusion 63 is projected upward on the outer face of the supporting shaft of the driving arm. In a state where the supporting shaft 6 is attached to the bearing 20, the extraction stopping protrusion 63 is located within the space between a pair of legs 26 of a gate 25.

5 Claims, 8 Drawing Sheets

DISK DRIVING DEVICE WITH IMPROVED DISK HOLDING FEATURES

BACKGROUND OF THE INVENTION

This invention relates to a disk driving device, and more particularly to a disk device in which a movable frame equipped with a turn table is adapted to be vertically swung between a clamping position of a disk placed on the turn table and a clamping releasing position by a vertical swinging operation of a driving arm of the movable arm.

FIGS. 5 and 6 are views for explaining the operation of a disk driving device. Referring to these figures, an explanation will be given of a basic structure and operation of the disk driving device of the kind described above.

In FIGS. 5 and 6, reference numeral 1 denotes a movable frame. Its attaching portion 2 at the rear end is attached to a supporting portion 3 provided in a cabinet (not shown). The turn table 1 is provided with a turn table 4 on which a disk (not shown) is placed. The movable frame 1 is provided with a driving arm 5 on the lower side. The driving arm 5 is provided with a supporting shaft 6 on the rear end. The supporting shaft 6 is supported by a bearing (described later) attached to the above cabinet. The driving arm 5 is provided with a protrusion 7 on the front end. The protrusion 7 is opposite to and slidably engaged with a cam face of a cam member 8 in a width direction. The cam member is slid in the width direction. Incidentally, reference symbol 9a is a protrusion provided to an intermediate portion of the driving arm 5 and reference symbol 9b is a stopper for limiting the vertical movement of the driving arm 5 in engagement with the protrusion 9a.

In the disk device having a structure explained with reference to FIGS. 5 and 6, as seen from FIG. 6, when the cam member 8 raises the driving arm 5 via the protrusion 7 around the supporting shaft 6, the movable frame 1 is swung upwards to take a horizontal posture at a fulcrum of a attaching position a of the attaching portion 2. By this operation, the disk (not shown) placed on the turn table 4 is clamped by cooperation of a receiving tool (not shown) and the turn table 4 so that it is integrated to the turn table 4. The raised position of the movable frame 1 when the disk is integrated to the turn table 4 refers to a clamping position. In a state where the movable frame 1 is located at the clamping position, recording or reproducing for the disk is performed. On the other hand, as seen from FIG. 6, when the cam member 8 moves downward the driving arm 5 at a fulcrum of the driving arm 5 through the protrusion 7, the movable frame 1 is swung downward to take a forward-falling posture at a fulcrum of the above attaching position a. By this operation, the integrated state of the disk placed on the turn table 4 and the turn table 4 is released. The lowered position of the movable frame 1 when the integrated state of the disk and turn table 4 has been released is a clamping releasing position of the movable 1. When the movable frame 1 is located at the clamping releasing position, mounting/dismounting for the disk is made for the turn table 4.

FIG. 7 is an exploded perspective view of the supporting shaft 6 of the driving arm 5 and the bearing 20 provided on the cabinet 10, viewed from below and askew, which were adopted in a conventional disk device. FIG. 8 is a schematic bottom view of a driving arm 5 built in the cabinet 10 viewed from an arrow of Y direction in FIG. 5 (below the disk device). FIG. 9 is an enlarged view in IX portion in FIG. 8. FIG. 10 is a sectional view taken in line X—X in FIG. 9.

As seen from FIG. 8, the driving arm 5 is formed in a ⊐-shape. The driving arm 5 is provided with the above supporting shafts 6, 6 on both right and left sides of the rear end, which are coaxial and project outwardly. The pair of bearings 20, 20 having the same structure are provided symmetrically on the left and right inner walls 10a of the bearing 10. Each bearing 20 enjoys a measure for swingably rotating the supporting shaft 6 (supporting-shaft supporting measure), a measure for attaching the driving arm 5 to the cabinet 10 through the supporting shaft 6 (assembling capability improving measure) and a measure for preventing the supporting shaft 6 from easily coming off from the bearing 20 even when the driving arm 5 or cabinet 10 bend by shock of e.g. falling. A detailed explanation will be given of these measures and actions obtained by these measures.

(Supporting Shaft Supporting Measure and Action thereof)

As seen from FIGS. 7, 9 and 10, the bearing 20 has a receiving surface for slidably receiving the outer surface 61 of the supporting shaft 6. The receiving surface is divided into four divided receiving surfaces 21, 22, 23 and 24. The first divided receiving surface 21 is constituted by the lower end face in a width direction of a beam 27 of a gate 25 which includes a pair of legs 26, 26 inwardly protruded from the cabinet 10 and the beam 27 extending between the upper ends of the legs 26, 26. The second receiving surface 22 is formed in a shape orthogonal to the first divided receiving surface by extending the inner face of a wall 28 formed by extending downward the one side leg 26 of the gate 25, i.e. the inner face of the leg 26. The third divided receiving surface 23 is oppositely provided apart from and in parallel to the second divided receiving surface 22. This third divided receiving surface 23 is formed by the side of a swelling convex piece 29 which is protruded inwardly from the cabinet. The fourth divided receiving surface 24 extends in parallel to the first divided receiving surface in a direction going from the second divided receiving surface to the third divided receiving surface. The fourth divided receiving surface 24 is formed by the upper face of a projecting piece 31 which projects sideways from the lower end of the wall 28.

In a state where the supporting shaft 6 is attached to the bearing 20, as seen from FIG. 10, the outer surface of the supporting shaft 6 is slidably received at four points every 90 degrees by the receiving surfaces which are a set of the first to fourth divided receiving surfaces 21 to 25 of the bearing 20. Therefore, the supporting shaft is rotatable at a fixed point in such a manner that it slides on the receiving surfaces which are a set of the first to fourth divided receiving surfaces of the bearing 20.

(Measure for Improving Assembling Capability and Action thereof)

The convex piece 29 having the above third divided receiving surface has a sloping guide surface 30 which connects the inner wall 10a of the cabinet 10 to the terminal edge 23a of the third divided receiving surface 23 located at the apex of the convex piece 29. Further, the first, second and fourth divided receiving surfaces 21, 22 and 24 have segments located more inward (indicated by arrow I in FIG. 9) of the cabinet 10 than the apex 29a of the convex piece 29. Further, a space S between the pair of legs 26 of the gate 25 is formed by an extracting trace of a mold. The entire convex piece 30 and the entire fourth divided receiving surface 24 overlook the space S in a direction of extracting the mold (indicated by arrow B in FIGS. 7 and 10). The first divided receiving surface 21 is formed longer than the fourth divided receiving surface 2.4.

In such a structure, the left and right supporting shafts 6, 6 of the driving arm 5 each is caused to overlook the convex piece 29 from behind of each the left and right bearings 20, 20 on the side of the cabinet 10. Thereafter, the supporting shafts 6, 6 are shifted forward as indicated by arrow C in FIG. 8. The left and right supporting shafts 6, 6 each slides to climb over the sloping guide surface 30 of the convex piece 29 and fit in the space encircled by the first to fourth divided receiving surfaces 21 to 24 and supported by the bearings 20. Thus, the driving arm 7 can be easily attached to the cabinet 10. Since the first, second and fourth divided receiving surfaces 21, 22 and 24 have segments located more inward (indicated by arrow I in FIG. 9) of the cabinet 10 than the apex 29a of the convex piece 29, when the supporting shafts 6, 6 each climbs over the sloping guide surface 30, the divided receiving surfaces 21, 22 and 24 serve to prevent the supporting shafts 6, 6 from deviating from the sloping guide surface 30. Thus, the above assembling operation can be made more easily. Further, since the first divided receiving surface 21 is formed to be longer than the fourth divided receiving surface 24, the supporting shafts 6, 6 each can be guided by the first receiving surface 21 so as to climb over the sloping guide surface 30 of the convex piece 29. This also contributes to make it easy, to perform the assembling.

(Coming-Off Preventing Measure and Action thereof)

As seen from FIG. 7, the supporting shaft 6 is provided with an extraction stopping protrusion 62 which is oriented downward. The protrusion 31 is provided with an engagement portion 33 which is formed by making a concave portion 32. The supporting shaft 6, as seen from FIGS. 9 and 10, is sliding-rotatably received by the first to fourth divided receiving surfaces 21 to 24. In addition, when the driving arm is located at the point as shown in FIG. 5, i.e. the raised position where the movable frame 1 is held at the clamping position, the extraction stopping protrusion 62 is fit in the concave portion 32.

In such a structure, when the driving arm is located at the raised position where the movable frame 1 is held at the clamping position, the extraction stopping protrusion 62 of the supporting shaft 6 has been fit in the concave portion 32 of the protrusion 31 as indicated by solid line in FIGS. 9 and 10. Therefore, even when the driving arm 5 or cabinet 10 bend by shock of e.g. falling, the extraction stopping protrusion 62 is engaged with the engagement portion 33 of the protrusion 31 and is prevented from coming off from the bearing 20. Incidentally, in FIG. 10, the raised position of the driving arm 5 where the movable frame 1 is held at the clamping position is indicated by one-dot chain line A1 and the lowered position of the driving arm 5 where the movable frame 1 is located at the clamping releasing, position is indicated by one-dot chain line A2.

On the other hand, the Unexamined Japanese Patent Application Publication No. Hei11-195284 describes a disk loading mechanism for a disk device for smoothly making a loading operation in such a manner that an internal mechanism chassis provided with a disk rotating motor and a center table and an up/down swing driving arm are oppositely and swingably connected to each other, and the rear end of the inner mechanism chassis and the front end of the up/down swing driving arm are swingably attached to an outer mechanism chassis. In this loading mechanism, a rotary supporting fulcrum shaft provided at the front end of the up/down swing driving arm is fit in a circular supporting hole.

Further, the Unexamined Japanese Patent Application Publication No. Sho61-206958 describes a disk player in which a mechanism chassis equipped with a turn table is moved vertically through an ascending/descending arm connected to a cam mechanism.

In the mechanism adopted in the conventional disk device described with reference to FIGS. 7 to 10, even when the driving arm 5 or cabinet 10 bend by shock of e.g. falling, the extraction stopping protrusion 62 is engaged with the engagement portion 33 of the protrusion 31 thereby being prevented from coming off from the bearing 20. However, as described above, such a coming-off preventing operation is shown only when the driving arm 5 is located at the raised position where the movable frame 1 is held at the clamping position. When the driving arm 5 is lowered so that the movable frame 1 is located at the clamping releasing position, the coming-off preventing operation is not shown. Even if shown, the degree of showing is insufficient. Specifically, when the driving arm 5 is lowered so that the movable frame 1 is located at the clamping releasing position, as indicated by a phantom line in FIG. 9 or 10, the extraction stopping protrusion 62 of the supporting shaft 6 is shifted like arrow d to the position outside the concave portion 32 of the protrusion 31. Therefore, the engagement portion 33 is not opposite to the extraction stopping protrusion 62 in the axial direction of the supporting shaft 6. As a result, when the driving arm 5 or cabinet 10 bends by shock of e.g. falling, and hence the supporting arm 6 or cabinet is shifted in the axial direction of the supporting shaft 6, as the case may be, the supporting shaft 6 comes off from the bearing 20 to fall.

SUMMARY OF THE INVENTION

This invention is accomplished under the above circumstance, and intends to provide a disk device which shows the action of preventing a supporting shaft from coming off from a bearing owing to shock such as falling irrespectively of whether a driving arm has been raised or lowered.

This invention also intends to provide a disk device which shows the action of preventing a supporting shaft from coming off from a bearing by doing a minimum change in design of only changing the position where an extraction stopping protrusion is formed for the conventional disk device.

Further, this invention intends to provide a disk device which can improve the action of preventing the supporting shaft from coming off from the bearing without impairing the actions of supporting the supporting shaft and improving the assembling capability shown by the conventional disk device.

The disk device according to this invention is provided with a driving arm for vertically swinging a movable frame, equipped with a turn table with a disk placed thereon, between a clamping position where, the disk placed on the turn table is integrated to the turn table and a clamping releasing position where the integrated state of the disk and turn table is released, the driving arm being provided with supporting shafts constituting swinging fulcrums, each the supporting arms having an outer surface which is slidably received by a receiving surface of each of bearings attached to a cabinet, the receiving surface of each the bearing consisting of a set of at least two divided segments, one of these divided receiving surfaces being constituted by the lower end face in a width direction of a beam of a gate which includes a pair of legs inwardly protruded from the cabinet and the beam extending between the upper ends of the legs.

In accordance with this invention, the supporting shaft is provided with an extraction stopping protrusion which is located at the position opposite to the beam in the space between the pair of legs of the gate, both when the driving arm has raised the movable frame to the clamping position and when the driving arm has lowered the movable frame to the clamping releasing position.

In such a structure, the extraction stopping protrusion is opposite to the beam of the gate constituting the bearing in the axial direction of the supporting shaft irrespectively of whether the driving arm has been raised or lowered. Therefore, even when the driving arm or cabinet bends by shock of e.g. falling to shift in the axial direction of the supporting shaft, the extraction stopping protrusion is engaged with the beam and is prevented from coming off from the bearing, thereby improving the action of preventing the supporting shaft from coming off.

It is preferred in this invention that the receiving surface of each the bearing is divided into four divided segments including a first divided receiving surface constituted by the lower end face in a width direction of a beam of a gate which includes a pair of legs inwardly protruded from the cabinet and the beam extending between the upper ends of the legs, a second receiving surface formed in a shape orthogonal to the first divided receiving surface by extending the inner face of the one side leg of the gate, a third divided receiving surface oppositely provided apart from and in parallel to the second divided receiving surface, and a fourth divided receiving surface which extends in parallel to the first divided receiving surface in a direction going from the second divided receiving surface to the third divided receiving surface, the third divided receiving surface being formed by the side of a swelling convex piece which is protruded inwardly from the cabinet, the convex piece having a sloping guide surface which connects the inner wall of the cabinet to the terminal edge of the third divided receiving surface located at the apex of the convex piece.

In such a structure, by only causing the supporting shaft to slide to climb over the sloping guide surface of the convex piece, the supporting can be fit in the bearing. Thus, the driving arm can be easily and simply attached to the cabinet, thereby improving the assembling capability.

It is preferred in this invention that the first, second and fourth divided receiving surfaces have segments located more inward of the cabinet than the apex of the convex piece.

In such a structure, when the supporting shaft climbs over the sloping guide surface, the first, second and fourth divided receiving surfaces serve to prevent the supporting shaft from deviating from the sloping guide surface, thereby further improving the assembling capability.

Further, it is preferred in this invention that a space between the pair of legs of the gate is formed by an extracting trace of a mold, the entire convex piece and the entire fourth divided receiving surface overlooks the space in a direction of extracting the mold, and the first divided receiving surface is formed longer than the fourth divided receiving surface.

In such a structure, since the first divided receiving surface is formed to be longer than the fourth divided receiving surface, the supporting shaft can be guided by the first receiving surface so as to travel to and thereafter climb over the sloping guide surface of the convex piece. This improves the assembling capability.

The disk device according to this invention can be provided with the following concrete structure. Specifically in the disk device is provided with a driving arm for vertically swinging a movable frame, equipped with a turn table with a disk placed thereon, between a clamping position where the disk placed on the turn table is integrated to the turn table and a clamping releasing position where the integrated state of the disk and turn table is released, the driving arm being provided with supporting shafts constituting swinging fulcrums, each the supporting arms having an outer surface which is slidably received by a receiving surface of each of bearings attached to a cabinet, the receiving surface of each the bearing being divided into four divided segments including a first divided receiving surface constituted by the lower end face in a width direction of a beam of a gate which includes a pair of legs inwardly protruded from the cabinet and the beam extending between the upper ends of the legs, a second receiving surface formed in a shape orthogonal to the first divided receiving surface by extending the inner face of the one side leg of the gate, a third divided receiving surface oppositely provided apart from and in parallel to the second divided receiving surface, and a fourth divided receiving surface which extends in parallel to the first divided receiving surface in a direction going from the second divided receiving surface to the third divided receiving surface, the third divided receiving surface being formed by the side of a swelling convex piece which is protruded inwardly from the cabinet, the convex piece having a sloping guide surface which connects the inner wall of the cabinet to the terminal edge of the third divided receiving surface located at the apex of the convex piece, the first, second and fourth divided receiving surfaces having segments located more inward of the cabinet than the apex of the convex piece, and a space between the pair of legs of the gate being formed by an extracting trace of a mold, the entire convex piece and the entire fourth divided receiving surface overlooking the space in a direction of extracting the mold, the first divided receiving surface being formed longer than the fourth divided receiving surface, the supporting shaft is formed in a circular shape in section, and, on an outer surface thereof, provided with an extraction stopping protrusion which is located at the position opposite to the beam in the space between the pair of legs of the gate, both when the driving arm has raised the movable frame to the clamping position and when the driving arm has lowered the movable frame to the clamping releasing position and the supporting shaft having the extraction stopping protrusion and the driving arm are integrally molded of synthetic resin.

In such a structure, by adopting the structure of the bearing described with reference to FIGS. 7 to 10, and only changing the position where the extraction stopping protrusion is to be attached to the supporting shaft, it is possible to provide a disk device which can show the supporting shaft supporting action and assembling capability improving action shown by the conventional disk device as they are and also show the action of preventing the supporting shaft from coming off from the bearing.

BRIEF DESCRIPTION OF THE DRAWINGS

FIG. 6 is a view for explaining the operation of the disk driving device in the related art.

FIG. 7 is an exploded perspective view of a supporting shaft and a bearing 20 viewed from below and askew, which are adopted in a disk device according to the related art.

DETAILED DESCRIPTION OF THE PREFERRED EMBODIMENTS

Figure 1:
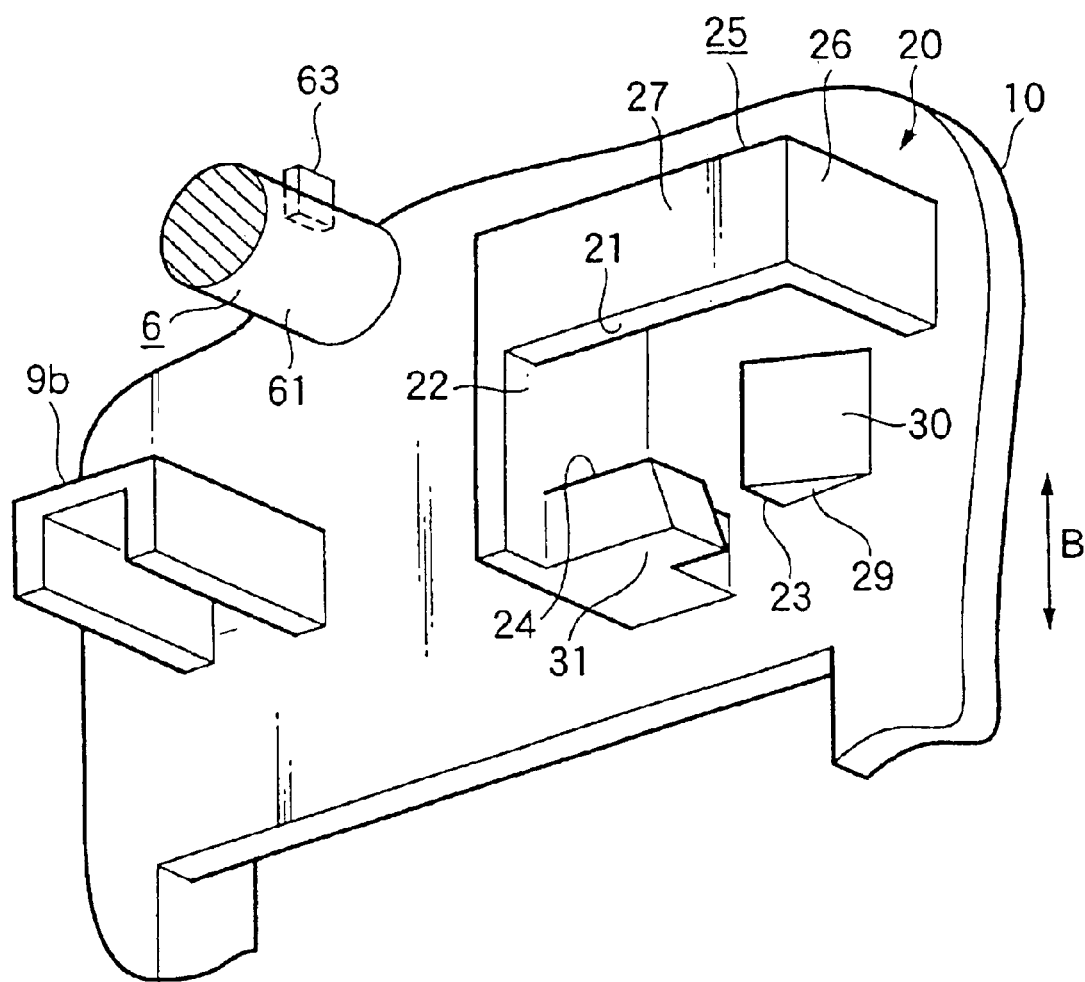
FIG. 1 is an exploded perspective view of a supporting shaft and a bearing 20 viewed from below and askew, which are adopted in a disk device according to this invention.
Figure 2:
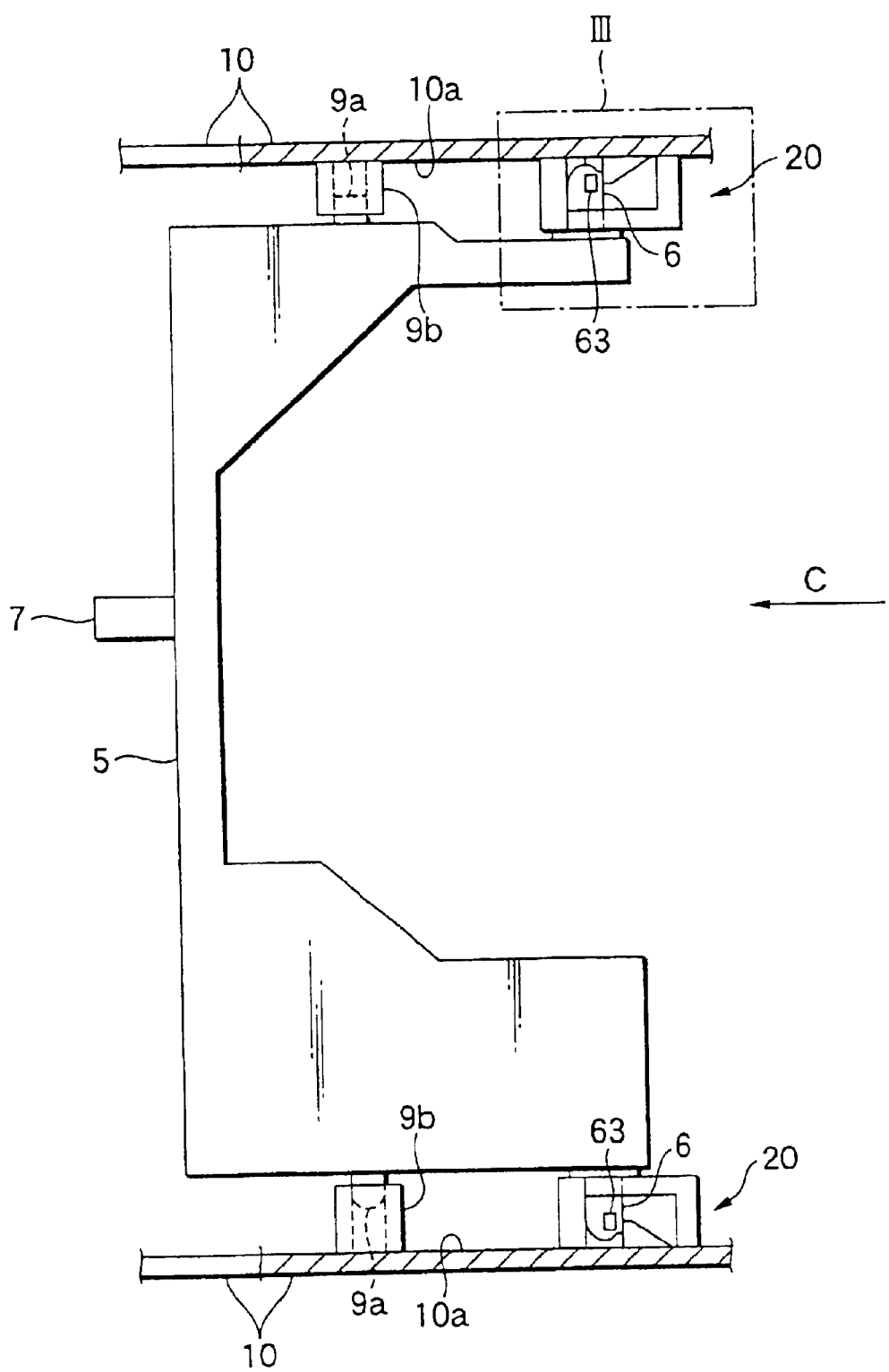
FIG. 2 is a schematic plan view of a driving arm 5 built in the cabinet viewed from above the disk device.
Figure 3:
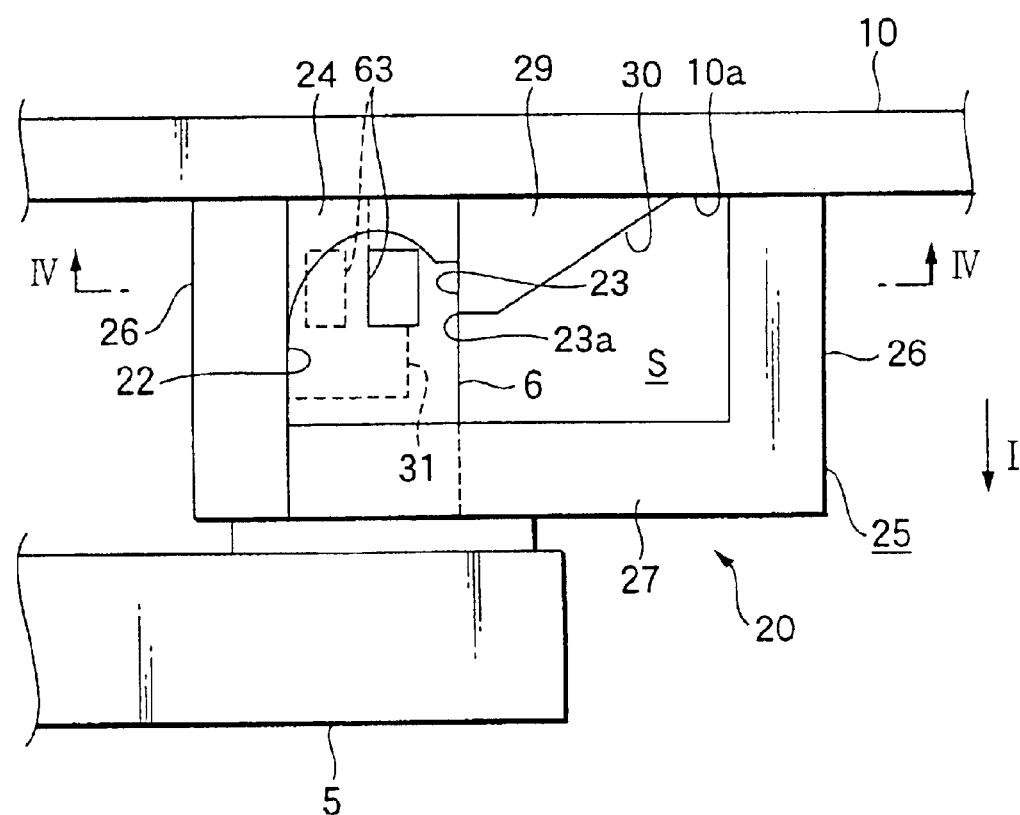
FIG. 3 is an enlarged view in III portion in FIG. 2.
Figure 4:
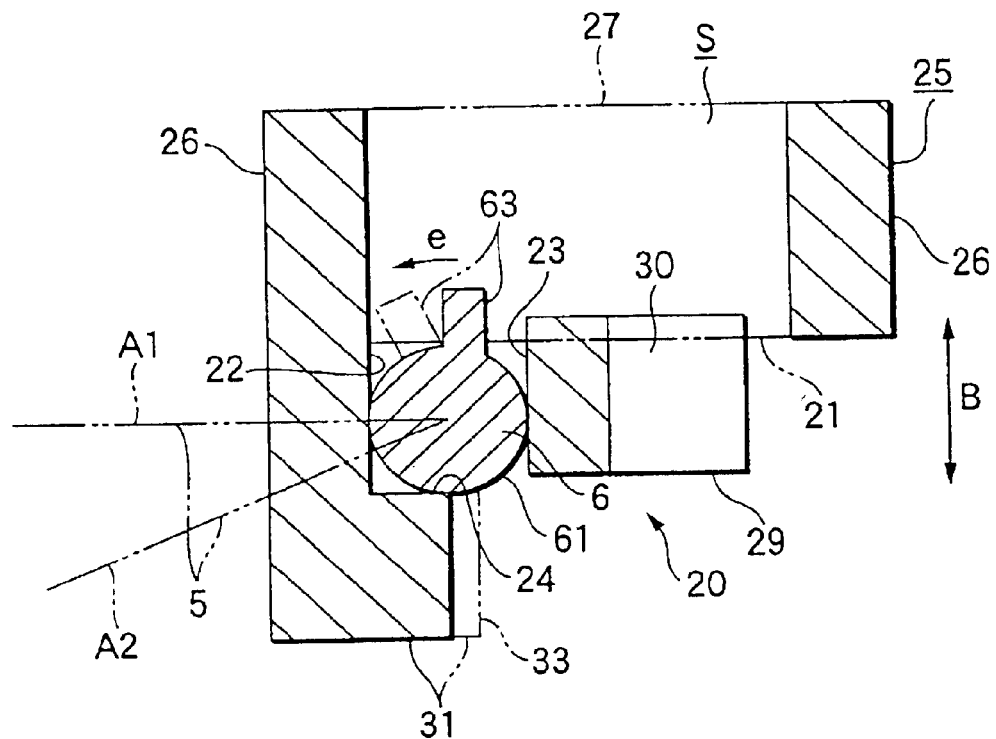
FIG. 4 is a sectional view taken in line IV—IV in FIG. 3.

FIG. 1 is an exploded perspective view of the supporting shaft 6 of the driving arm 5 and the bearing 20 provided on the cabinet 10, viewed from below and askew, which are adopted in a disk device according to this invention. FIG. 2 is a schematic plan view of a driving arm 5 built in the cabinet 10 viewed from an arrow of Y direction in FIG. 5 (above the disk device). FIG. 3 is an enlarged view in III portion in FIG. 2. FIG. 4 is a sectional view taken in line IV—IV in FIG. 3.

This embodiment is different from the configuration with reference to FIGS. 7 to 10 in a position where the extraction stopping protrusion 63 is to be attached to the supporting shaft 6. The structure of the bearing 20 is exactly the same as that in FIGS. 7 to 10. For avoiding repetition of explanation, in FIGS. 1 to 4, like reference numerals refer to like parts in FIGS. 7 to 10.

As seen from FIG. 2, the driving arm 5 is formed in a U-shape. The driving arm 5 is provided with the supporting shafts 6, 6 on both right and left sides of the rear end, which are coaxial and project outwardly. The supporting shafts 6, 6 are attached to the pair of bearings 20, 20 which have the same structure and are provided symmetrically on the left and right inner walls 10a of the cabinet 10. As described with reference to FIG. 5, when the cam member 8 raises the driving arm 5 via the protrusion 7 around the supporting shaft 6, the movable frame 1 is swung upwards to take a horizontal posture at a fulcrum of an attaching position a of the attaching portion 2. By this operation, the movable frame 1 reaches the clamping position where recording or reproducing of the disk is made. On the other hand, as seen from FIG. 6, when the cam member 8 lowers the driving arm 5 at a fulcrum of the driving arm 5 through the protrusion 7, the movable frame 1 is swung downward to take a forward-falling posture at a fulcrum of the above attaching position a. By this operation, the movable frame 1 reaches the clamping releasing position so that mounting/dismounting for the disk can be made for the turn table 4.

As described with reference to FIGS. 7 to 10, the bearing 20 enjoys a supporting-shaft supporting measure for swingably rotating the supporting shaft 6, an assembling capability improving measure for easily and simply attaching the driving arm 5 to the cabinet 10 through the supporting shaft 6 and a coming-off preventing measure for preventing the supporting shaft 6 from easily coming off from the bearing even when the driving arm 5 or cabinet 10 bend by shock of e.g. falling. A detailed explanation will be given of these measures and effects obtained by these measures.

(Supporting Shaft Supporting Measure and Action thereof)

As shown in FIGS. 1, 3 or 4, the bearing 20 has a receiving surface for slidably receiving the outer surface 61 of the supporting shaft 6. The receiving surface is divided into four divided receiving surfaces 21, 22, 23, and 24. The first divided receiving surface 21 is constituted by the lower end face in a width direction of a beam 27 of a gate 25 which includes a pair of legs 26, 26 inwardly protruded from the cabinet 10 and the beam 27 extending between the upper ends of the legs 26, 26. The second receiving surface 22 is formed in a shape orthogonal to the first divided receiving surface 21 by extending the inner face of the one side leg 26 of the gate 25. The third divided receiving surface 23 is oppositely provided apart from and in parallel to the second divided receiving surface 22. This third divided receiving surface 23 is formed by the side of a swelling convex piece 29 which is protruded inwardly from the cabinet. The fourth divided receiving surface 24 extends in parallel to the first divided receiving surface in a direction going from the second divided receiving surface to the third divided receiving surface. The fourth divided receiving surface 24 is formed by the upper face of a projecting piece 31 which projects sideways from the lower end of the wall 28.

In a state where the supporting shaft 6 is attached to the bearing 20, as seen from FIG. 4, the outer surface of the supporting shaft 6 is slidably received at four points every 90 degrees by the receiving surfaces which are a set of the first to fourth divided receiving surfaces 21 to 25 of the bearing 20. Therefore, the supporting shaft is rotatable at a fixed point in such a manner that it slides on the receiving surfaces which are a set of the first to fourth divided receiving surfaces of the bearing 20.

(Measure for Improving Assembling Capability and Action thereof)

The convex piece 29 having the above third divided receiving surface has a sloping guide surface 30 which connects the inner wall 10a of the cabinet 10 to the terminal edge 23a of the third divided receiving surface 23 located at the apex of the convex piece 29. Further, the first, second and fourth divided receiving surfaces 21, 22 and 24 have segments located more inward (indicated by arrow I in FIG. 3) of the cabinet 10 than the apex 29a of the convex piece 29. Further, a space S between the pair of legs 26 of the gate 25 is formed by an extracting trace of a mold. The entire convex piece 30 and the entire fourth divided receiving surface 24 overlook the space S in a direction of extracting the mold (indicated by arrow B in FIGS. 1 and 4). The first divided receiving surface 21 is formed longer than the fourth divided receiving surface 24.

In such a structure, the left and right supporting shafts 6, 6 of the driving arm 5 each is caused to overlook the convex piece 29 from behind of each the left and right bearings 20, 20 on the side of the cabinet 10. Thereafter, the supporting shafts 6, 6 are shifted forward as indicated by arrow C in FIG. 8. The left and right supporting shafts 6, 6 each slides to climb over the sloping guide surface 30 of the convex piece 29 and fit in the space encircled by the first to fourth divided receiving surfaces 21 to 24 and supported by the bearings 20. Thus, the driving arm 7 can be easily attached to the cabinet 10. Since the first, second and fourth divided receiving surfaces 21, 22 and 24 have segments located more inward (indicated by arrow I in FIG. 9) of the cabinet 10 than the apex 29a of the convex piece 29, when the supporting shafts 6, 6 each climbs over the sloping guide surface 30, the divided receiving surfaces 21, 22 and 24 serves to prevent the supporting shafts 6, 6 from deviating from the sloping guide surface 30. Thus, the above assembling operation can be made more easily. Further, since the first divided receiving surface 21 is formed to be longer than the fourth divided receiving surface 24, the supporting shafts 6, 6 each can be guided by the first receiving surface 21 so as to climb over the sloping guide surface 30 of the convex piece 29. This also contributes to make it easy to perform the assembling.

The supporting shaft supporting measure and action thereof and the assembling capability improving measure and action thereof are entirely the same as those described in connection with FIGS. 7 to 10.

(Coming-Off Preventing Measure and Action thereof)

As seen from FIG. 1, the supporting shaft 6 is provided with an extraction stopping protrusion 63 which is oriented upwards. The extraction stopping protrusion 63, as shown in FIGS. 3 and 4, is located at the position opposite to the beam 27 in the space S between the pair of legs of the gate 25. In addition, the extraction stopping protrusion 63 is located at the above position opposite to the beam 27 both when the driving arm 5 has raised the movable frame 1 (see FIGS. 5 and 6) to the clamping position and when the driving arm 5 has lowered the movable frame 1 to the clamping releasing position. Further, the supporting shaft 6 is formed in a circular shape in section, and the supporting shaft 6 having the extraction stopping protrusion 63 and the driving arm are integrally molded of synthetic resin.

Figure 5:
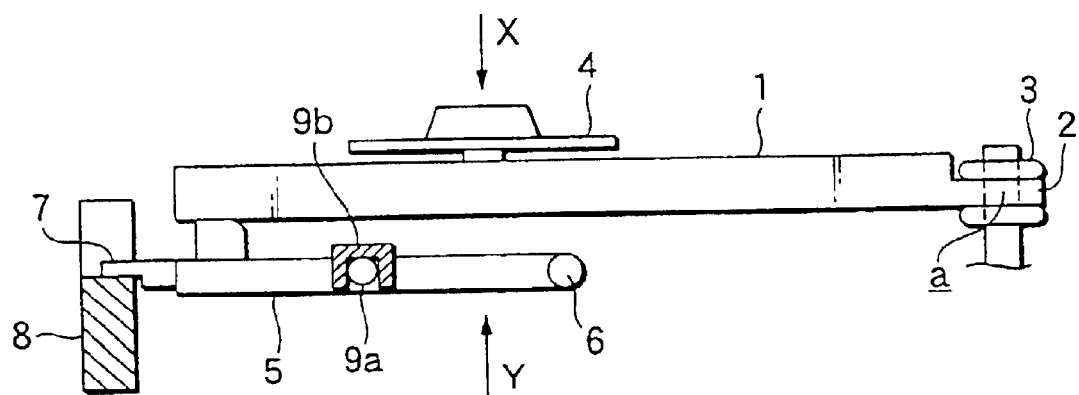
FIG. 5 is a view for explaining the operation of a disk driving device in the related art.
Figures 6, 7:
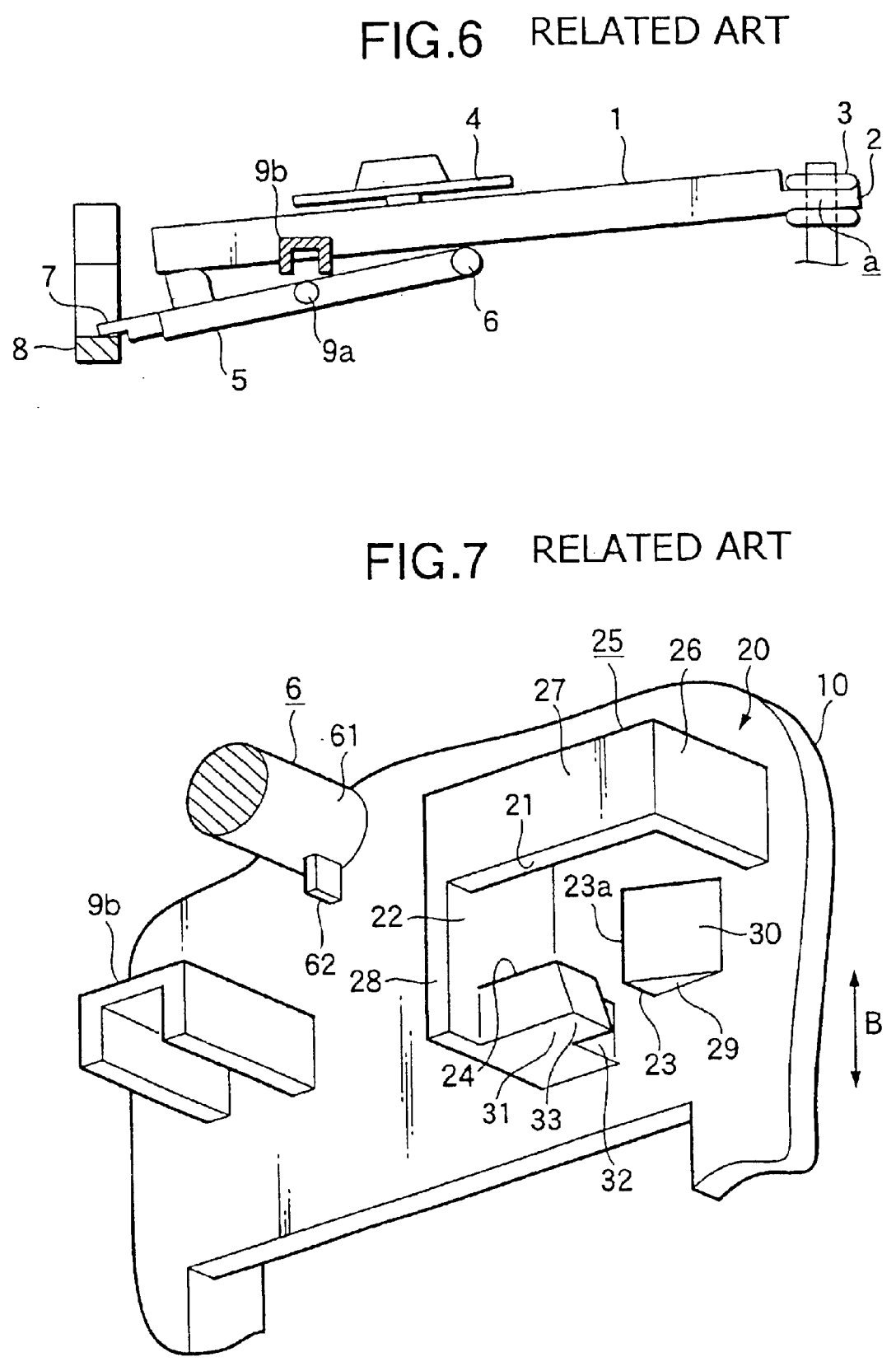
Figure 8:
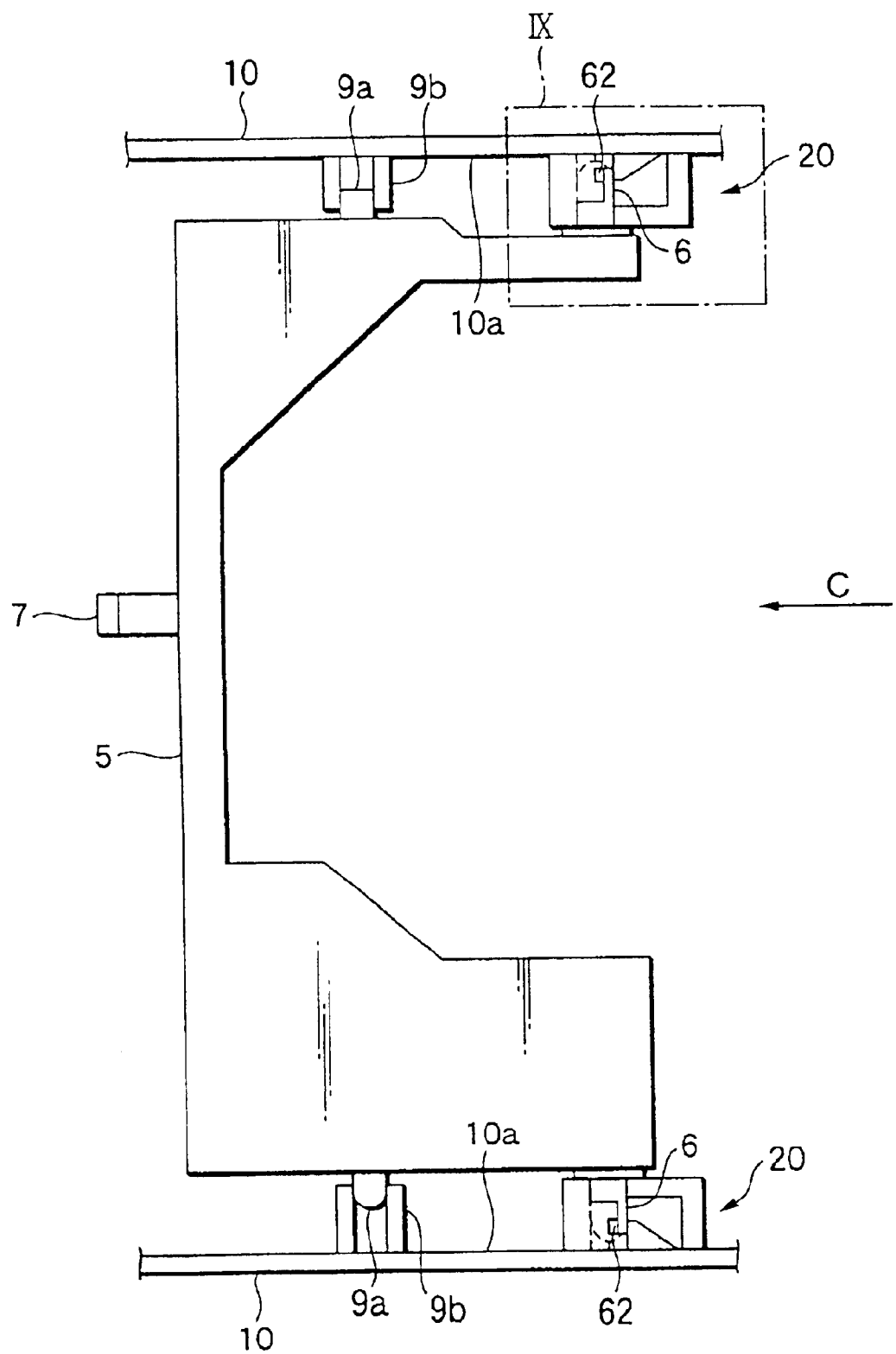
FIG. 8 is a schematic plan view of a driving arm built in the cabinet viewed from above the disk device in the related art.

In such a structure, as explained with reference to FIG. 5, when the driving arm is located at the raised position where the movable frame 1 is held at the clamping position, as indicated by solid line in FIGS. 3 and 4, the extraction stopping protrusion 63 of the supporting shaft is located in an upstanding posture at the position opposite to the beam 27 within the space S. Therefore, even when the driving arm 5 or cabinet 10 bends by shock of e.g. falling to shift in the axial direction of the supporting shaft 6, the extraction stopping protrusion 63 is engaged with the beam 27 and is prevented from coming off from the bearing 20. Further, as explained with reference to FIG. 6, when the driving arm 5 is located at the lowered position where the movable frame 1 is held at the clamping releasing position, the extraction stopping protrusion 63 of the supporting shaft 6 is shifted like arrow e as indicated by phantom line in FIG. 3 or 4, and located in a slanted posture at the position opposite to the beam 27 within the space S. Therefore, even when the driving arm 5 or cabinet 10 bends by shock of e.g. falling to shift in the axial direction of the supporting shaft 6, the extraction stopping protrusion 63 is engaged with the beam 27 and is prevented from coming off from the bearing 20. Incidentally, in FIG. 4, the raised position of the driving arm 5 where the movable frame 1 is held at the clamping position is indicated by one-dot chain line A1 and the lowered position of the driving arm 5 where the movable frame 1 is located at the clamping releasing position is indicated by one-dot chain line A2.

As described above, in this embodiment, by providing the supporting shaft 6 with the extraction stopping protrusion 63 oriented upward and preparing the other elements such as a bearing 20 in the same construction as that in the prior art, it is possible to show the coming-off preventing action without impairing the supporting shaft supporting action and the assembling capability improving action. Thus, by adopting the prior art as it is as the cabinet 10 provided with the bearings 20 and by only changing the driving arm 5 integrally provided with the supporting shaft 6, it is possible to provide a disk device which shows excellent supporting shaft supporting action and assembling capability improving action and also shows coming-off preventing action.

Figure 9:
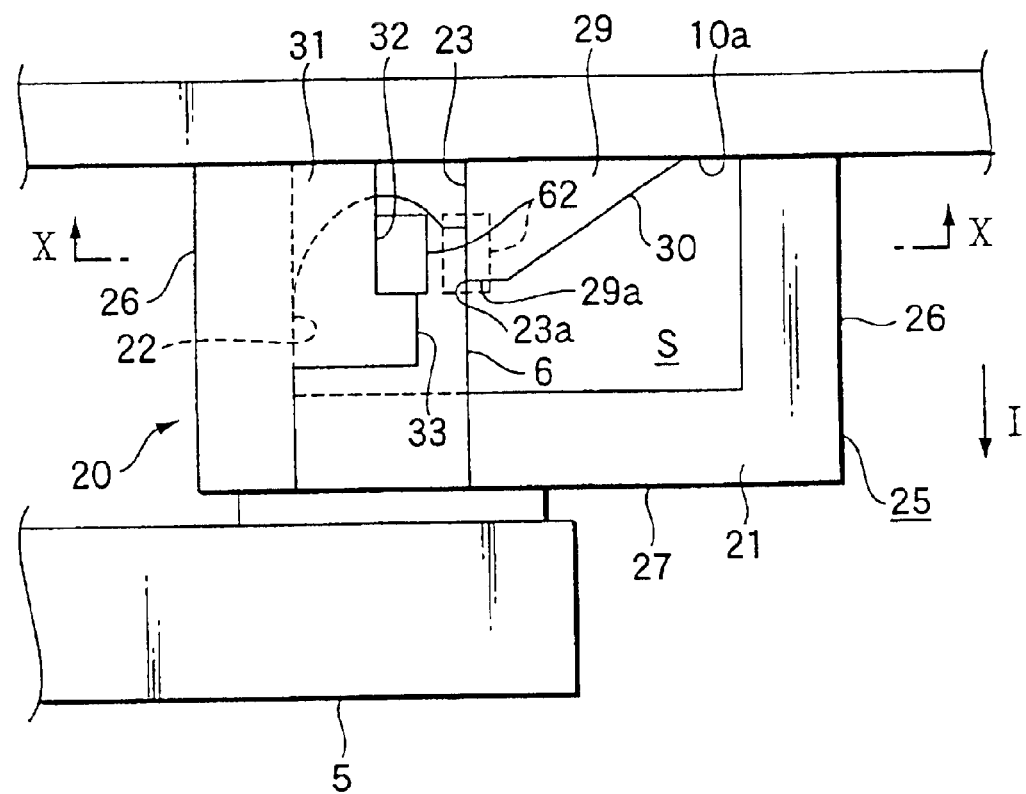
FIG. 9 is related art in an enlarged view in IX portion of FIG. 8.
Figure 10:
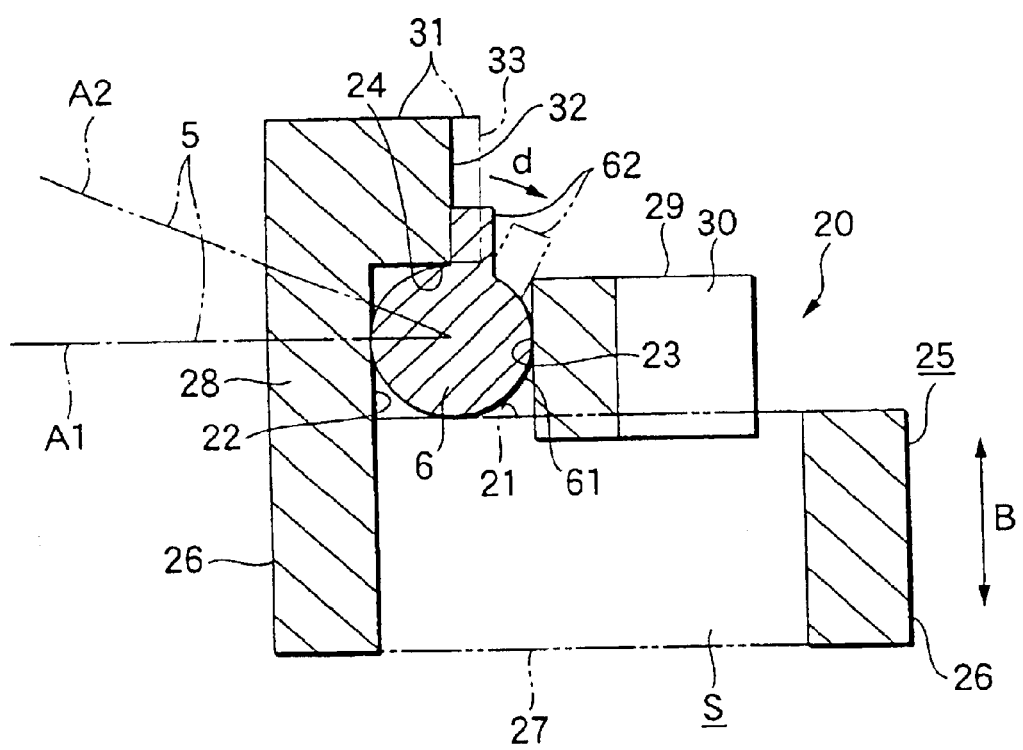
FIG. 10 is the related art in a sectional view taken in line X—X of FIG. 9.

Incidentally, in the disk device according to this embodiment, provision of the concave portion 32 explained in FIG. 9 is not required. If the cabinet in the prior art is adopted as it is, the concave portion 32 is left at the protrusion 31 as it is. However, even when the concave portion 32 is left at the protrusion 31, it will not impair the above supporting shaft supporting action, assembling capability improving action and coming-off preventing action.

In this embodiment, the receiving surface of the bearing is divided into four segments including the first to fourth divided receiving surfaces 21 to 24. However, in order to show only the action of preventing the supporting shaft from coming off from the bearing, the receiving surface of the bearing may be prepared in a three-divided structure by forming the second and third divided receiving surfaces in a continuous arc shape, or otherwise in a two-divided structure by forming the second to fourth divided receiving surfaces 22, 23 and 24 in a continuous arc shape.

As described above, in accordance with the disk device according to this invention, irrespectively of whether the driving arm has been raised or lowered, the action of preventing the supporting shaft from coming off from the bearing owing to shock such as falling can be shown satisfactorily. Therefore, the following situations do not occur. Namely, while the disk device is transported, or while the disk device is handled by a user, the supporting shaft comes from the bearing which results in a poor operation. Further, the action of preventing a supporting shaft from coming off from a bearing can be satisfactorily shown by doing a minimum change in design of only changing the position where an extraction stopping protrusion is to be attached to the supporting shaft of the driving arm for the conventional disk device. This does not lead to cost increase.

What is claimed is:

1. A disk device comprising:
    a turn table with a disk placed thereon, and
    a driving arm for vertically swinging a movable frame, equipped with said turn table, between a clamping position where the disk placed on said turn table is integrated to said turn table and a clamping releasing position where the integrated state of the disk and said turn table is released,
    said driving arm including supporting shafts constituting swinging fulcrums,
    each said supporting shafts including an outer surface which is slidably received by a receiving surface of each of bearings attached to a cabinet,
    the receiving surface of each said bearing being divided into four divided segments including a first divided receiving surface constituted by the lower end face in a width direction of a beam of a gate which includes a pair of legs inwardly protruded from the cabinet and the beam extending between the upper ends of the legs, a second receiving surface formed in a shape orthogonal to the first divided receiving surface by extending the inner face of the one side leg of the gate, a third divided receiving surface oppositely provided apart from and in parallel to the second divided receiving surface, and a fourth divided receiving surface which extends in parallel to said first divided receiving surface in a direction going from said second divided receiving surface to said third divided receiving surface,
    said third divided receiving surface being formed by the side of a swelling convex piece which is protruded inwardly from the cabinet, the convex piece having a sloping guide surface which connects the inner wall of the cabinet to the terminal edge of the third divided receiving surface located at the apex of the convex piece,
    said first, second and fourth divided receiving surfaces including segments located more inward of said cabinet than the apex of said convex piece, and
    a space between the pair of legs of said gate being formed by an extracting trace of a mold,
    said entire convex piece and said entire fourth divided receiving surface overlooking the space in a direction of extracting the mold, said first divided receiving surface being formed longer than said fourth divided receiving surface, wherein said supporting shafts are formed in a circular shape in section, and wherein an outer surface of said supporting shafts includes an extraction stopping protrusion, wherein said extraction stopping protrusion is located at a position opposite to said beam in said space between the pair of legs of said gate, both when said driving arm has raised the movable frame to the clamping position and when said driving arm has lowered said movable frame to the clamping releasing position, wherein said supporting shafts having said extraction stopping protrusions and said driving arm are integrally molded of synthetic resin.

2. A disk device comprising:

a turn table with a disk placed thereon, and a driving arm for vertically swinging a movable frame, equipped with said turn table, between a clamping position where the disk placed on said turn table is integrated to said turn table and a clamping releasing position where the integrated state of the disk and said turn table is released, said driving arm including supporting shafts constituting swinging fulcrums, each said supporting shafts including an outer surface which is slidably received by a receiving surface of each of bearings attached to a cabinet, the receiving surface of each said bearing including a set of at least two divided segments, one of the divided receiving surfaces being constituted by the lower end face in a width direction of a beam of a gate which includes a pair of legs inwardly protruded from said cabinet and said beam extending between the upper ends of said legs, wherein said supporting shafts include an extraction stopping protrusion which is located at the position opposite to said beam in the space between the pair of legs of said gate, both when said driving arm is raised said movable frame to the clamping position and when said driving arm is lowered said movable frame to the clamping releasing position.

3. The disk device according to claim 2, wherein the receiving surface of each said bearing is divided into four divided segments including a first divided receiving surface constituted by the lower end face in a width direction of a beam of a gate which includes a pair of legs inwardly protruded from the cabinet and the beam extending between the upper ends of the legs, a second receiving surface formed in a shape orthogonal to the first divided receiving surface by extending the inner face of the one side leg of the gate, a third divided receiving surface oppositely provided apart from and in parallel to the second divided receiving surface, and a fourth divided receiving surface which extends in parallel to the first divided receiving surface in a direction going from the second divided receiving surface to the third divided receiving surface, said third divided receiving surface is formed by the side of a swelling convex piece which is protruded inwardly from the cabinet, and the convex piece has a sloping guide surface which connects the inner wall of the cabinet to the terminal edge of said third divided receiving surface located at the apex of the convex piece.

4. The disk device according to claim 3, wherein said first, second and fourth divided receiving surfaces have segments located more inward of the cabinet than the apex of the convex piece.

5. The disk device according to claim 4, wherein a space between the pair of legs of the gate is formed by an extracting trace of a mold, the entire convex piece and the entire fourth divided receiving surface overlooks the space in a direction of extracting the mold, and said first divided receiving surface is formed longer than said fourth divided receiving surface.

* * * * *